United States Patent
Shiozawa

(10) Patent No.: US 9,167,244 B2
(45) Date of Patent: Oct. 20, 2015

(54) IMAGE CODING APPARATUS AND METHOD THEREOF

(71) Applicant: CANON KABUSHIKI KAISHA, Tokyo (JP)

(72) Inventor: Kimio Shiozawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 13/901,057

(22) Filed: May 23, 2013

(65) Prior Publication Data

US 2013/0315301 A1    Nov. 28, 2013

(30) Foreign Application Priority Data

May 25, 2012  (JP) .................. 2012-119175
Mar. 14, 2013  (JP) .................. 2013-052495

(51) Int. Cl.
| | |
|---|---|
| H04N 19/124 | (2014.01) |
| H04N 19/176 | (2014.01) |
| H04N 19/149 | (2014.01) |
| H04N 19/15  | (2014.01) |
| H04N 19/119 | (2014.01) |

(52) U.S. Cl.
CPC ......... H04N 19/0009 (2013.01); H04N 19/124 (2013.01); H04N 19/149 (2013.01); H04N 19/15 (2013.01); H04N 19/176 (2013.01); H04N 19/119 (2013.01)

(58) Field of Classification Search
None
See application file for complete search history.

(56) References Cited

U.S. PATENT DOCUMENTS

| | | | |
|---|---|---|---|
| 6,952,447 B2 | 10/2005 | Oishi | |
| 7,720,144 B2 | 5/2010 | Oishi | |
| 8,208,538 B2 | 6/2012 | Oishi | |
| 2003/0058937 A1* | 3/2003 | Oishi | ............ 375/240.03 |
| 2005/0207489 A1 | 9/2005 | Oishi | |
| 2010/0189176 A1 | 7/2010 | Oishi | |

FOREIGN PATENT DOCUMENTS

JP    2003-102007 A    4/2003

* cited by examiner

*Primary Examiner* — Dave Czekaj
*Assistant Examiner* — Nam Pham
(74) *Attorney, Agent, or Firm* — Canon U.S.A., Inc. IP Division

(57) ABSTRACT

An image coding apparatus configured to support a coding scheme capable of selecting a size of a block to be coded from a plurality of sizes includes a quantization unit configured to assign a quantization step size to each block of an image to be coded and quantize each block, a coding unit configured to code image data relating to each block quantized by the quantization unit, a minimum quantization step value setting unit configured to set a minimum quantization step value according to the size of each block and apply the minimum quantization step value to each block of the image to be coded, and a quantization step determination unit configured to determine the quantization step size of each block not to fall below the minimum quantization step value thereof.

13 Claims, 10 Drawing Sheets

FIG. 3A

| 7 | 7 | 10 11 / 10 12 | 10 | 6 | ...... | 11 | 9 8 10 10 / 10 10 10 11 / 10 12 13 12 / 10 13 13 13 |
| 8 | 10 | 11 | 7 10 / 10 9 | | | | |

| 15 14 / 14 15 | 15 | 17 | 15 | 17 | ...... | 17 | 14 18 / 19 18 | 19 |
| 16 | 16 | | 17 | 15 | | 19 | 18 | |

FIG. 3B

| 10 | 10 | 12 12 / 12 12 | 10 | 8 | ...... | 11 | 12 12 12 12 / 12 12 12 12 / 12 12 13 12 / 12 13 13 13 |
| 10 | 10 | 11 | 12 12 / 12 12 | | | | |

| 12 12 / 14 12 | 11 | 13 | 12 | 13 | ...... | 11 | 13 12 / 12 13 | 12 |
| 12 | 12 | | 13 | 12 | | 12 | 12 | |

☐ :16 PIXELS × 16 PIXELS
  MinQs = 8

☐ :8 PIXELS × 8 PIXELS
  MinQs = 10

▫ :4 PIXELS × 4 PIXELS
  MinQs = 12

: 16 PIXELS × 16 PIXELS
MinQs = 8

: 16 PIXELS × 16 PIXELS
MinQs = 8

: 8 PIXELS × 8 PIXELS
MinQs = 7

: 8 PIXELS × 8 PIXELS
MinQs = 10

: 4 PIXELS × 4 PIXELS
MinQs = 6

: 4 PIXELS × 4 PIXELS
MinQs = 12

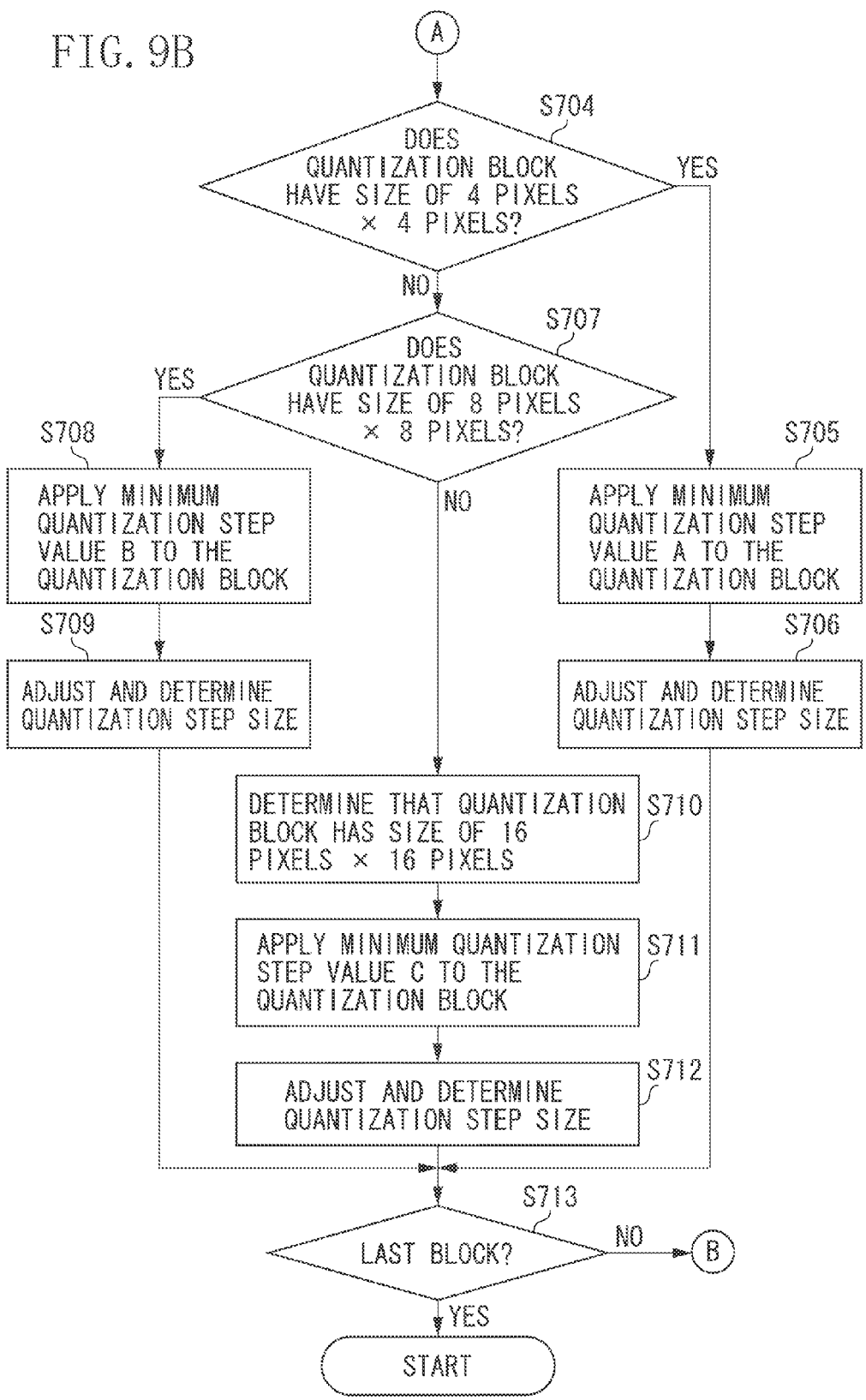

IMAGE CODING APPARATUS AND METHOD THEREOF

BACKGROUND OF THE INVENTION

1. Field of the Invention

The present disclosure generally relates to image coding and, more particularly, to an image coding apparatus that compresses and codes a moving image, and a method thereof.

2. Description of the Related Art

Digital devices that can record a moving image, like a digital video camera and a hard disk recorder, have recently been prevalent. Such digital devices compress and code moving image data so that a moving image with a large amount of information is efficiently stored on a recording medium of limited capacity such as a flash memory and a hard disk. Typical compression coding schemes of a moving image include Motion Picture Experts Group (MPEG) and H.264. Such compression coding schemes of a moving image compress the amount of information (the amount of data) by utilizing high autocorrelation (i.e., high redundancy) that many video signals have. Among the redundancies of a video signal are time redundancy and two-dimensional (intra-picture) spatial redundancy. Time redundancy can be reduced by using block-by-block motion detection and motion compensation. Spatial redundancy can be reduced by using discrete cosine transform (DCT) and quantization. The compression and coding of a moving image further includes compression of the amount of data by using entropy coding.

The foregoing compression coding schemes of a moving image include the above-mentioned quantization of DCT coefficient data after DCT is performed. For the purpose of quantization, only one quantization step size is given to a macroblock of 16×16 pixels. Japanese Patent Application Laid-Open No. 2003-102007 discusses an apparatus in which a minimum value of a quantization step to give is determined frame by frame to efficiently assign code amounts to various types of moving images like ones with few motions and ones with a lot of motions.

In the field of moving image compression coding, a technique has been discussed that allows the quantized units of blocks to be variable, to further improve the coding efficiency. The technology discussed in Japanese Patent Application Laid-Open No. 2003-102007 is predicated on a condition that macroblocks (blocks to be quantized) to which a quantization step size is to be assigned have a fixed size. Therefore, the technology discussed in Japanese Patent Application Laid-Open No. 2003-102007 is not per se applicable to a compressing coding method for a moving image in which the units of blocks to be quantized are variable.

SUMMARY OF THE INVENTION

The present disclosure is directed to an image coding apparatus and a method thereof that are made applicable to a compression coding method for a moving image in which the units of blocks for a quantization step size to be assigned to are variable, and that can set a minimum quantization step value.

According to an aspect of the present disclosure, an image coding apparatus configured to support a coding scheme capable of selecting a size of a block to be coded from a plurality of sizes includes a quantization unit configured to assign a quantization step size to each block of an image to be coded and quantize each block, a coding unit configured to code image data relating to each block quantized by the quantization unit, a minimum quantization step value setting unit configured to set a minimum quantization step value according to the size of each block and apply the minimum quantization step value to each block of the image to be coded, and a quantization step determination unit configured to determine the quantization step size of each block not to fall below the minimum quantization step value thereof.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIGS. 3A and 3B illustrate examples of distribution of quantization step sizes.

FIGS. 9A and 9B are flowcharts illustrating an example of control processing according to the second exemplary embodiment.

DESCRIPTION OF THE EMBODIMENTS

Various exemplary embodiments, features, and aspects of the disclosure will be described in detail below with reference to the drawings.

Figure 1:
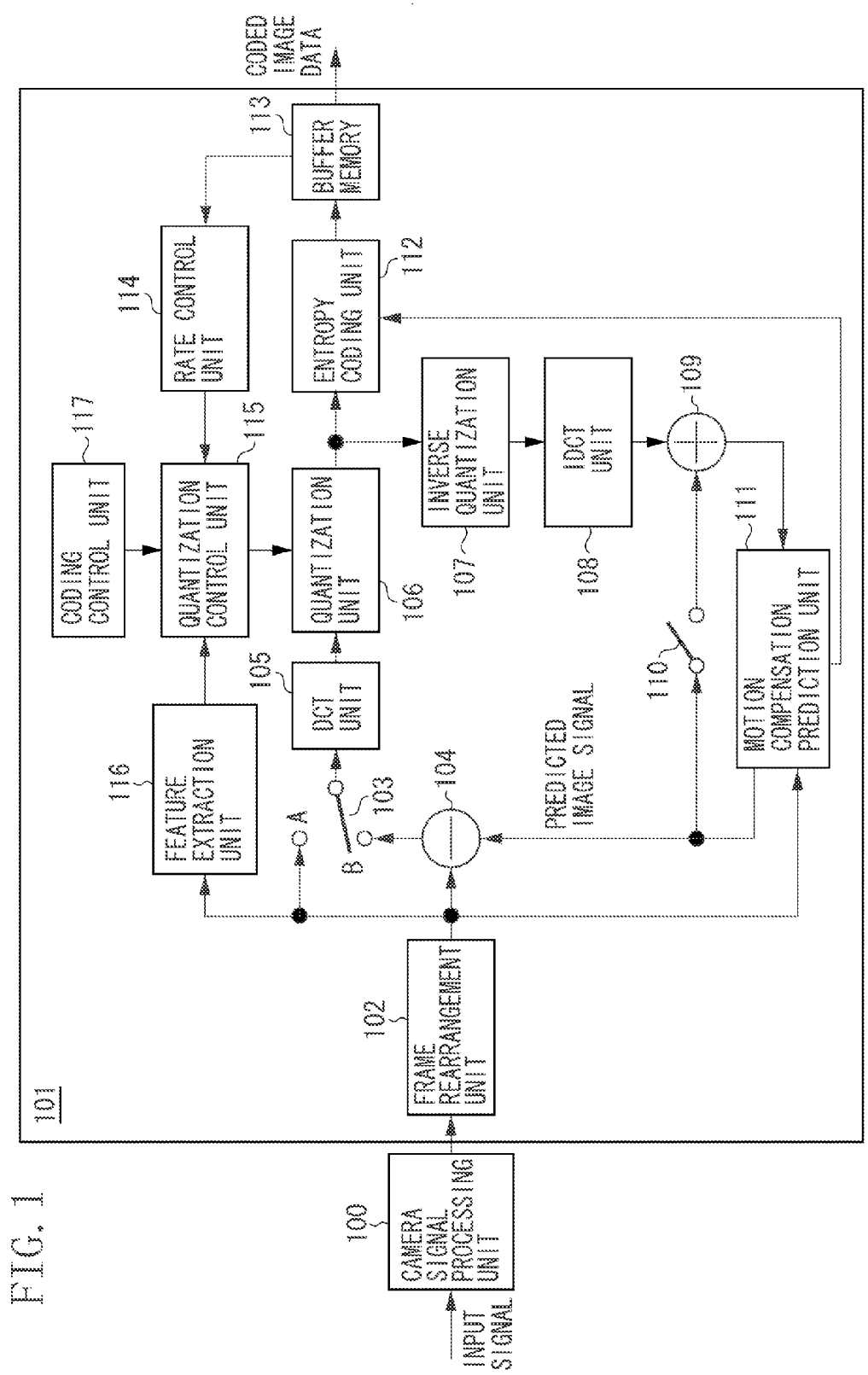
FIG. 1 is a schematic configuration block diagram of an image coding apparatus according to a first exemplary embodiment of the present disclosure.

FIG. 1 is a schematic configuration block diagram of an image coding apparatus according to a first exemplary embodiment of the present disclosure. In the exemplary embodiment illustrated in FIG. 1, an image signal from an image sensor is used as an input signal. A camera signal processing unit 100 performs matrix processing on the input signal to generate a luminance signal and a chrominance signal, and performs processing including gamma processing and analog-to-digital (A/D) conversion. The camera signal processing unit 100 outputs the processed signals and information used in the processing to an image coding apparatus 101.

A coding control unit 117 and a quantization control unit 115 include an arithmetic unit such as a central processing unit (CPU). The coding control unit 117 issues a control signal for controlling operations of the image coding apparatus 101 including the quantization control unit 115. The quantization control unit 115 controls quantization processing based on the control signal from the coding control unit 117.

A frame rearrangement unit 102 rearranges an input image signal input to the image coding apparatus 101 in order according to the order of frames to be coded, and outputs the resultant to a switch 103, a subtractor 104, a motion compensation prediction unit 111, and a feature extraction unit 116.

The image coding apparatus 101 codes each frame (picture) of the input image signal in predetermined coding order by using intra-picture coding (I-picture) and inter-picture prediction coding (P-picture or B-picture). The input image signal is divided into blocks of variable block sizes, quantized, and coded. The coding control unit 117 connects the switch 103 to a terminal A when coding a frame of the input image signal as an I-picture. The coding control unit 117 connects the switch 103 to a terminal B when coding a frame of the input image signal as a P- or B-picture. When the switch 103 is connected to the terminal A, an image signal output from the frame rearrangement unit 102 is simply input to a DCT unit 105.

The subtractor 104 calculates a difference between an image signal of a P- or B-picture from the frame rearrangement unit 102 and a predicted image signal output from the motion compensation prediction unit 111. The subtractor 104 outputs a residual signal which is supplied to the DCT unit 105 through the switch 103. Subtracting the predicted image signal from the input image signal reduces redundancy in a time-axis direction.

The DCT unit 105 applies discrete cosine transform processing to the image signal (the residual signal in the case of a P- or B-picture) from the switch 103, and outputs the resulting DCT coefficients to a quantization unit 106. The quantization unit 106 quantizes the DCT coefficients from the DCT unit 105 according to a quantization step size of the block to be quantized (quantization block), which is specified by the quantization control unit 115, and outputs the quantized DCT coefficients to an entropy coding unit 112.

The quantized DCT coefficients obtained by the quantization unit 106 are also supplied to an inverse quantization unit 107 for local decoding. The inverse quantization unit 107 inversely quantizes the quantized DCT coefficients from the quantization unit 106, and outputs representative values of the DCT coefficients to an inverse discrete cosine transform (IDCT) unit 108. The IDCT unit 108 applies inverse DCT processing to the representative values of the DCT coefficients from the inverse quantization unit 107, and outputs the resulting locally-decoded image signal to an adder 109.

The coding control unit 117 turns a switch 110 off when the IDCT unit 108 outputs a locally-decoded image signal of an I-picture. The coding control unit 117 turns the switch 110 on when the IDCT unit 108 outputs a locally-decoded image signal of a P- or B-picture. When the switch 110 is off, the adder 109 simply outputs the output signal of the IDCT unit 108 to the motion compensation prediction unit 111. When the switch 110 is on, the adder 109 adds the predicted image signal from the motion compensation prediction unit 111 to the locally-decoded image signal from the IDCT unit 108, and outputs the result of addition to the motion compensation prediction unit 111.

The motion compensation prediction unit 111 stores the locally-decoded image signals of I- and P-pictures output from the adder 109 in a built-in memory, divides the image signals into units of blocks including a plurality of pixels, and reads the image signals block by block. The motion compensation prediction unit 111 compares the image signals read from the built-in memory with the image signal of a P- or B-picture from the frame rearrangement unit 102 block by block, detects motion vectors that minimize differences, and generates a predicted image signal. The motion compensation prediction unit 111 supplies the generated predicted image signal to the subtractor 104 and the switch 110, and outputs the detected motion vectors to the entropy coding unit 112.

The entropy coding unit 112 entropy-codes the quantized DCT coefficients (i.e., quantized image data) from the quantization unit 106, multiplexes the motion vectors from the motion compensation prediction unit 111, and outputs the resultant to a buffer memory 113. A rate control unit 114 monitors occupancy of coded image data stored in the buffer memory 113, and notifies the quantization control unit 115 of the occupancy.

The quantization control unit 115 receives the information about the occupancy (generation code amount) of the coded image data in the buffer memory 113 from the rate control unit 114. The quantization control unit 115 further receives picture type information about the frame to be coded and a target data rate as a quantization control signal from the coding control unit 117. The picture type information indicates any one of I-, P-, and B-pictures. The target data rate is a target value serving as an index of the data rate of the coded image data to generate. The coding control unit 117 can select the size of a quantization block in the frame to be coded from a plurality of values. The coding control unit 117 notifies the quantization control unit 115 of the selected block size as information about the quantization block in the frame.

Based on such information, the quantization control unit 115 assigns a target code amount to each frame according to the target data rate. The quantization control unit 115 further determines the quantization step size of each block in the frame according to the target code amount of the frame and information about the quantization blocks in the frame (including sizes, positions, and the number). The quantization step size dominates the code amount to be assigned to each block. Here, the quantization control unit 115 sets and applies minimum quantization step values to the blocks, with each quantization block to be quantized as a unit of quantization.

Figure 2:
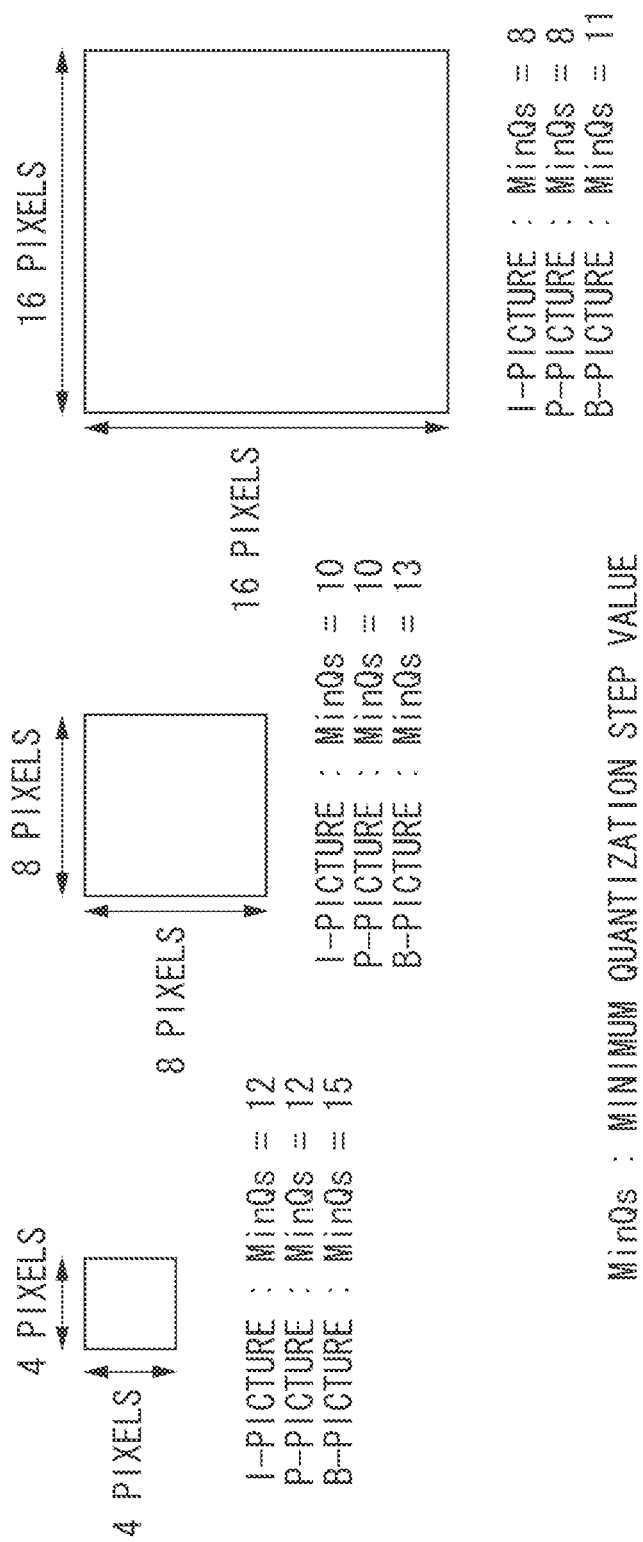
FIG. 2 is an explanatory diagram illustrating minimum quantization step values corresponding to each block size according to the first exemplary embodiment.

FIG. 2 is a schematic diagram illustrating minimum quantization step values. In the present exemplary embodiment, blocks of 4 pixels×4 pixels, 8 pixels×8 pixels, and 16 pixels× 16 pixels in size may be selected as units of quantization blocks. The range of size selections is not limited to the foregoing, and may include other block sizes like 32 pixels× 32 pixels and 64 pixels×64 pixels. FIG. 2 illustrates an example where minimum quantization step values (Min Qs) are set for respective quantization blocks and respective picture types. The greater the block size, the more block noise (deterioration of image quality) caused by quantization becomes visually noticeable. In any picture type, the minimum quantization step value is, therefore, set to be smaller (to increase the image quality) as the block size increases.

For example, if the target data rate is 6 Mbps, the quantization control unit 115 sets minimum quantization step values having the values illustrated in FIG. 2 for respective picture types and respective quantization block sizes. The quantization control unit 115 then assigns an average code amount to individual blocks and calculates quantization step sizes. More specifically, the quantization control unit 115 sets minimum quantization step values for each picture type according to block sizes and the target data rate (target code amount). The quantization control unit 115 further sets the quantization step size of each quantization block not to fall below the set minimum quantization step value thereof. In other words, the quantization control unit 115 has a function as a minimum quantization step value setting unit that sets the minimum quantization step values, and a function as a quantization step determination unit that sets quantization step sizes not to fall below the minimum quantization step values.

The quantization control unit 115 also has a function of adjusting the quantization step sizes according to features of images corresponding to the quantization blocks, which is extracted by the feature extraction unit 116. More specifically, the quantization control unit 116 adjusts, according to the features extracted by the feature extraction unit 116, the quantization step sizes of the respective quantization blocks within a range not to fall below the minimum quantization step values. When the minimum quantization step values are set, some blocks may produce code amounts smaller than the target code amount. In such cases, the quantization control unit 115 adjusts the quantization step sizes of other blocks whose quantization step sizes are far greater than the minimum quantization step values to be closer to the minimum quantization step values, so that the code amounts available are assigned to the other blocks. The quantization control unit 115 sets such adjusted quantization step sizes of the quantization blocks into the quantization unit 106.

FIGS. 3A and 3B illustrate examples of distribution of quantization step sizes for each quantization block in a frame. FIG. 3A illustrates the distribution of quantization step sizes with no minimum quantization step values set. FIG. 3B illustrates the distribution of quantization step sizes with the minimum quantization step values set according to the present exemplary embodiment. In FIG. 3A, regardless of block sizes, quantization step sizes as relatively small as 6 to 13 are set in an upper part of the frame and quantization step sizes as relatively large as 14 to 19 are set in a lower part of the frame. Such a phenomenon occurs when the quantization step sizes set in the upper part of the frame are so small that quantization step sizes greater than appropriate values are set in the lower part of the frame, because of short of code amount.

In FIG. 3B, in the presence of restrictions by the minimum quantization step values in an upper part of the frame, the quantization step sizes of the blocks will not fall below the respective minimum quantization step values. This can suppress a waste of the generation code amount in the upper part of the frame to produce an appropriate code amount available. The available code amount can be assigned to lower blocks of the frame. As a result, the quantization step sizes set in the lower blocks of the frame become small as compared to the example illustrated in FIG. 3A. Besides, different minimum quantization step values are set for different block sizes. Since deterioration becomes more noticeable with an increasing block size, the minimum quantization step values for greater blocks can be made smaller to achieve both the suppression of a waste of the generation code amount and a reduction of visual deterioration.

Figure 6:
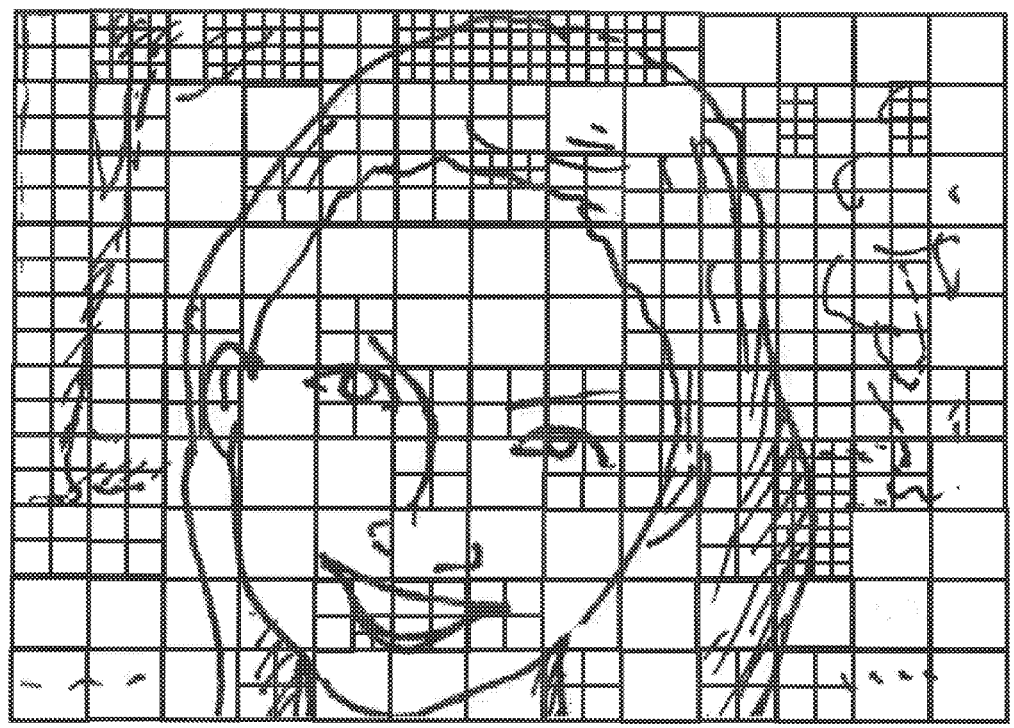
FIG. 6 illustrates an example where the first exemplary embodiment is applied to a scene.

FIG. 6 illustrates an example where the present exemplary embodiment is applied to coding of an actual scene. As illustrated in FIG. 6, the coding control unit 117 assigns blocks of 16 pixels×16 pixels to smooth image areas of a uniform color like skin color and sky blue. The coding control unit 117 assigns blocks of 8 pixels×8 pixels or 4 pixels×4 pixels to image areas of complicated patterns. According to conventional techniques, the code amount can be wasted in the background portions and hair portions in the upper part of the frame, which leads to a decrease in the image quality of the face portions in the lower part of the frame. According to the present exemplary embodiment, for example, in a facial close-up scene like FIG. 6, appropriate code amounts are distributed to the blocks of skin color in the lower part of the frame. In other words, deterioration ascribable to coding can be reduced even in a scene where many blocks of particularly large sizes appear in the lower part of the frame.

Figure 7:
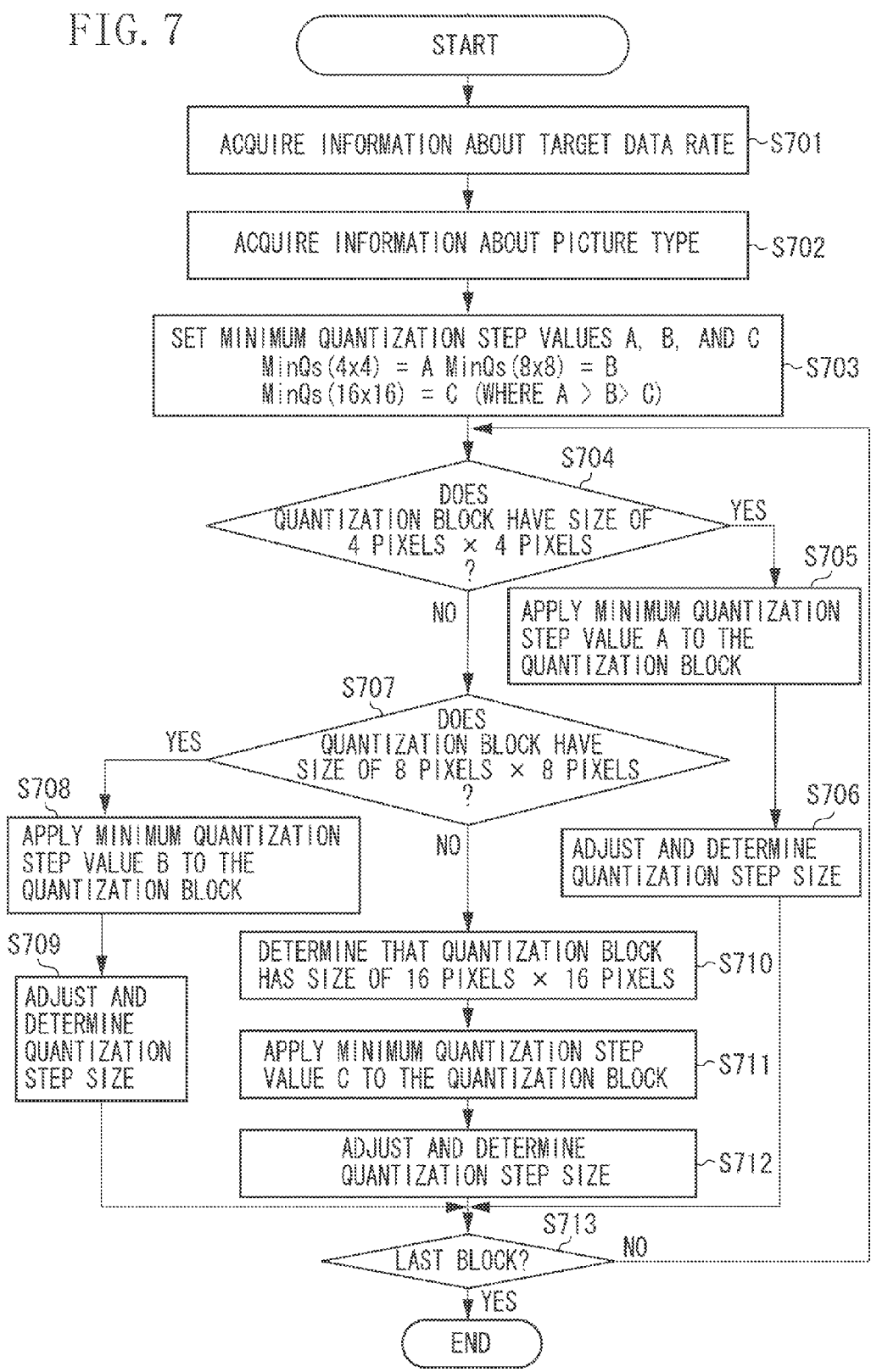
FIG. 7 is a flowchart illustrating an example of control processing according to the first exemplary embodiment.

FIG. 7 is a flowchart illustrating an example of control processing executed by the quantization control unit 115 according to the present exemplary embodiment. This flowchart is implemented by loading a program stored in a read-only memory (ROM) of the quantization control unit 115 into a random access memory (RAM) and executing the program by the CPU.

In step S701, the quantization control unit 115 acquires information about a target data rate. In step S702, the quantization control unit 115 acquires information about the picture type of an image to be coded. In step S703, the quantization control unit 115 sets minimum quantization step values A, B, and C for respective block sizes according to each picture type and based on the target data rate. In the present exemplary embodiment, the quantization control unit 115 sets the minimum quantization step values A, B, and C to satisfy A>B>C, where A is the minimum quantization step value for 4 pixels×4 pixels, B is the minimum quantization step value B for 8 pixels×8 pixels, and C is the minimum quantization step value C for 16 pixels×16 pixels. FIG. 2 illustrates the minimum quantization step values set here.

In step S704, if the intended quantization block has a size of 4 pixels×4 pixels (YES in step S704), then in step S705, the quantization control unit 115 applies the minimum quantization step value A to the quantization block. In step S706, the quantization control unit 115 adjusts the quantization step size of the quantization block within a range not to fall below the minimum quantization step value A, and determines the value.

In step S707, if the intended quantization block has a size of 8 pixels×8 pixels (YES in step S707), then in step S708, the quantization control unit 115 applies the minimum quantization step value B to the quantization block. In step S709, the quantization control unit 115 adjusts the quantization step size within a range not to fall below the minimum quantization step value B, and determines the value.

If the intended quantization block does not have a size of 4 pixels×4 pixels or 8 pixels×8 pixels (NO in step S704 and NO in step S707), then in step S710, the quantization control unit 115 determines that the quantization block has a size of 16 pixels×16 pixels. In step S711, the quantization control unit 115 applies the minimum quantization step value C to the quantization block. In step S712, the quantization control unit 115 adjusts the quantization step size within a range not to fall below the minimum quantization step value C, and determines the value. In step S713, after the determination of the quantization step size in any of steps S706, S709, and S712, the quantization control unit 115 determines whether the quantization block is the last block of the frame to be coded. If the quantization block is not the last block (NO in step S713), the quantization control unit 115 repeats the flow of step S704 and subsequent steps on the next quantization block. If the quantization block is the last block (YES in step S713), the quantization control unit 115 ends the flow and waits for the quantization of a next frame.

As has been described above, according to the present exemplary embodiment, the minimum quantization step values of the individual quantization blocks are set depending on the block sizes thereof. This can prevent code amounts from being wastefully assigned to blocks on which no visual effect cannot be expected even with reduced quantization step sizes. This can also improve the image quality of the entire frame, and especially in lower blocks of the frame.

Figure 5:
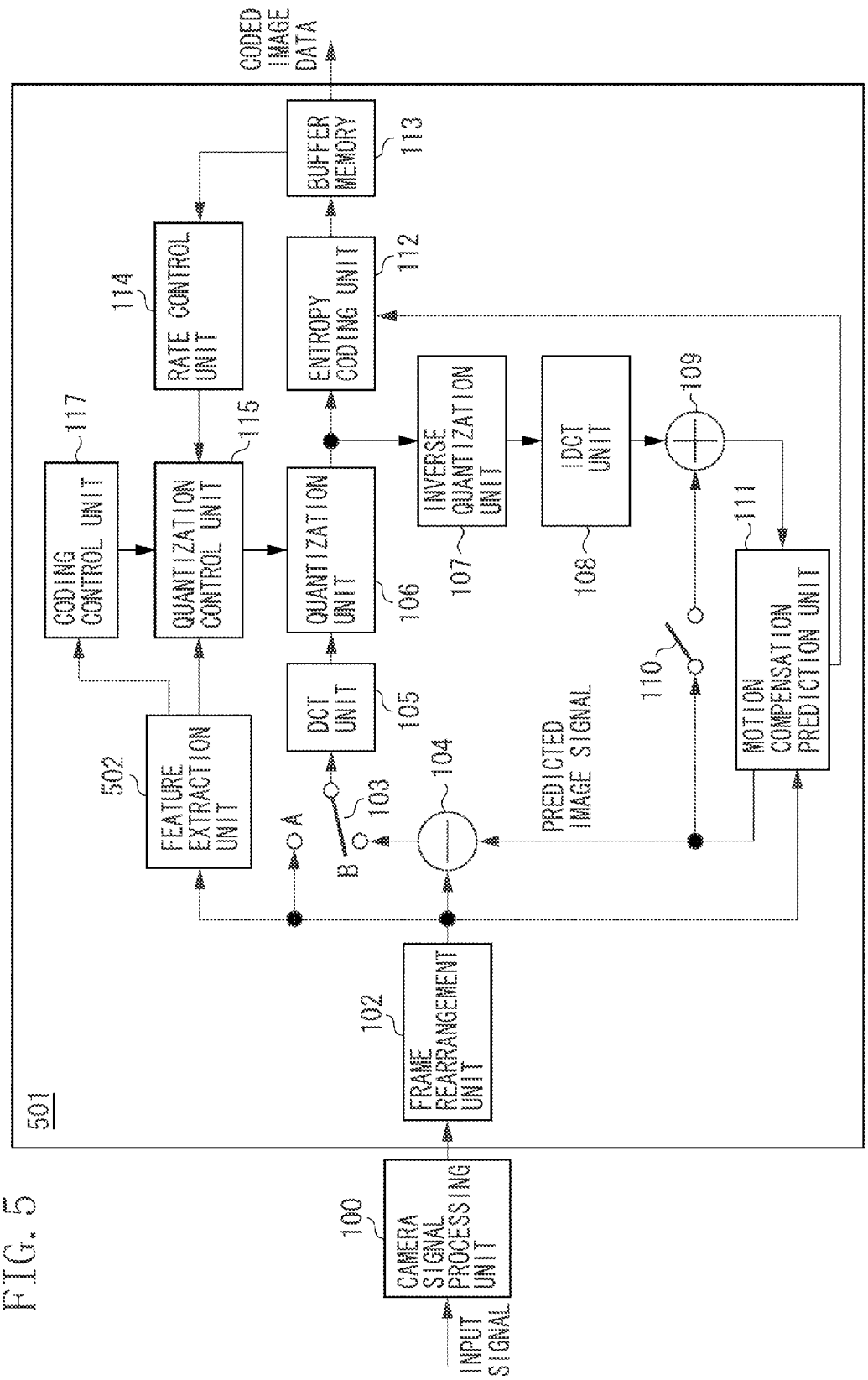
FIG. 5 is a schematic configuration block diagram of an image coding apparatus according to the second exemplary embodiment of the present disclosure.

In the foregoing first exemplary embodiment, the quantization control unit 115 sets the minimum quantization step values based on the block size and the target data rate according to an instruction from the coding control unit 117. In a second exemplary embodiment of the present disclosure, the quantization control unit 115 sets the minimum quantization step values according to the block size, information about whether an object is a main object in the input image, and a degree of difficulty of coding. FIG. 5 is a schematic configuration block diagram of an image coding apparatus 501 according to the second exemplary embodiment. The image coding apparatus 501 includes a feature extraction unit 502. The feature extraction unit 502 has a function of arithmetically detecting a variance value, which indicates the degree of difficulty of coding, for each block as feature information about the image of the block. The feature extraction unit 502 further has a function of detecting blocks within a main object area in the image (frame) to be coded, by using distance detection and face detection techniques. The feature extraction unit 502 then outputs feature information to the coding control unit 117 and the quantization control unit 115. The feature information includes information about the degrees of difficult of coding in the frame to be coded and information about the main object area. The other blocks of the image coding apparatus 501 have functions similar to those of the blocks having the same reference numerals illustrated in FIG. 1. A detailed description thereof will thus be omitted.

Figure 4A:
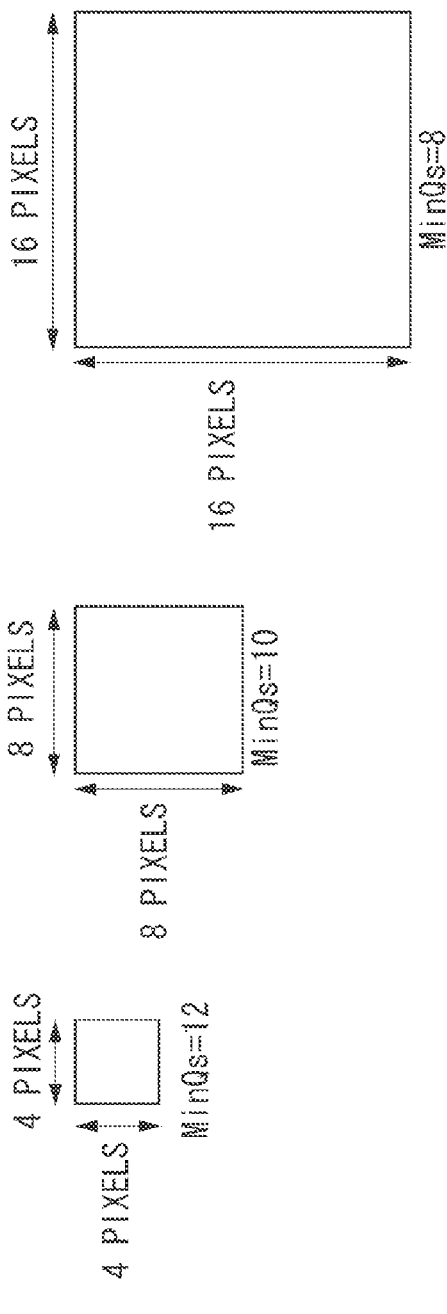
FIGS. 4A and 4B are explanatory diagrams illustrating minimum quantization step values corresponding to each block size according to a second exemplary embodiment of the present disclosure.

Images cluttered with objects of complicated patterns (i.e., images including a lot of high frequency components) have higher variance values, and deterioration of those images is less noticeable visually. In such cases, overhead other than DCT coefficients increases as the quantization blocks become smaller. As illustrated in FIG. 4A, if the image is complicated, the quantization control unit 115 according to the present exemplary embodiment thus includes a mode of setting greater minimum quantization step values for quantization blocks of smaller sizes.

Figure 4B:
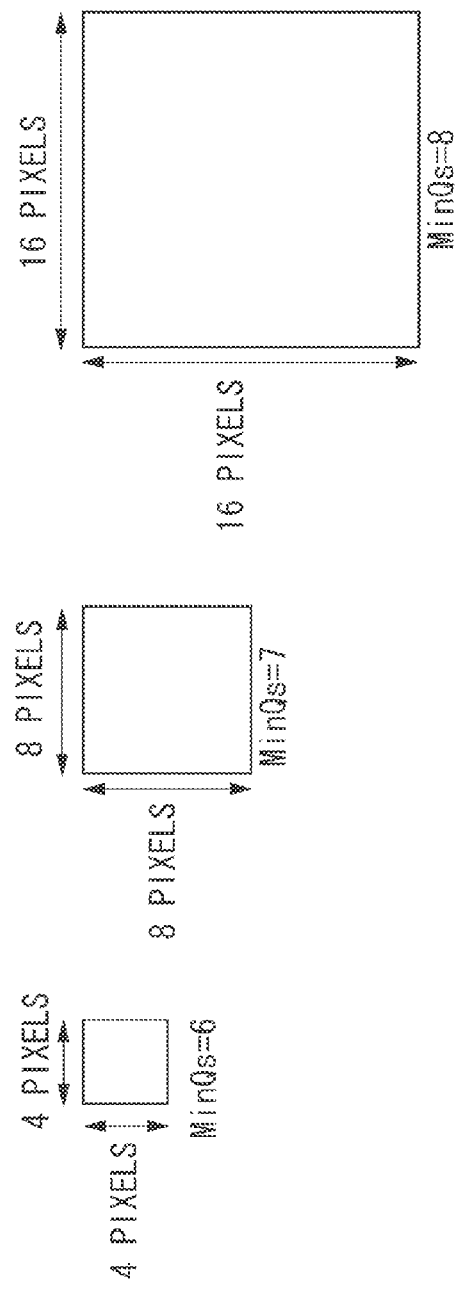

If a block having a high variance value is included in a main object, detail-oriented image quality is considered to be needed. Examples include small areas of complicated patterns lying in a wide smooth image area, and complicated image areas lying in and round a facial image (such as eyes, nose, and hairs). Based on such an assumption, in the present exemplary embodiment, as illustrated in FIG. 4B, the quantization control unit 115 further includes a mode of setting smaller minimum quantization step values for quantization blocks of smaller sizes. The image coding apparatus 501 according to the present exemplary embodiment employs different methods for setting the minimum quantization step values according to such features of the image to be coded.

Figure 8:
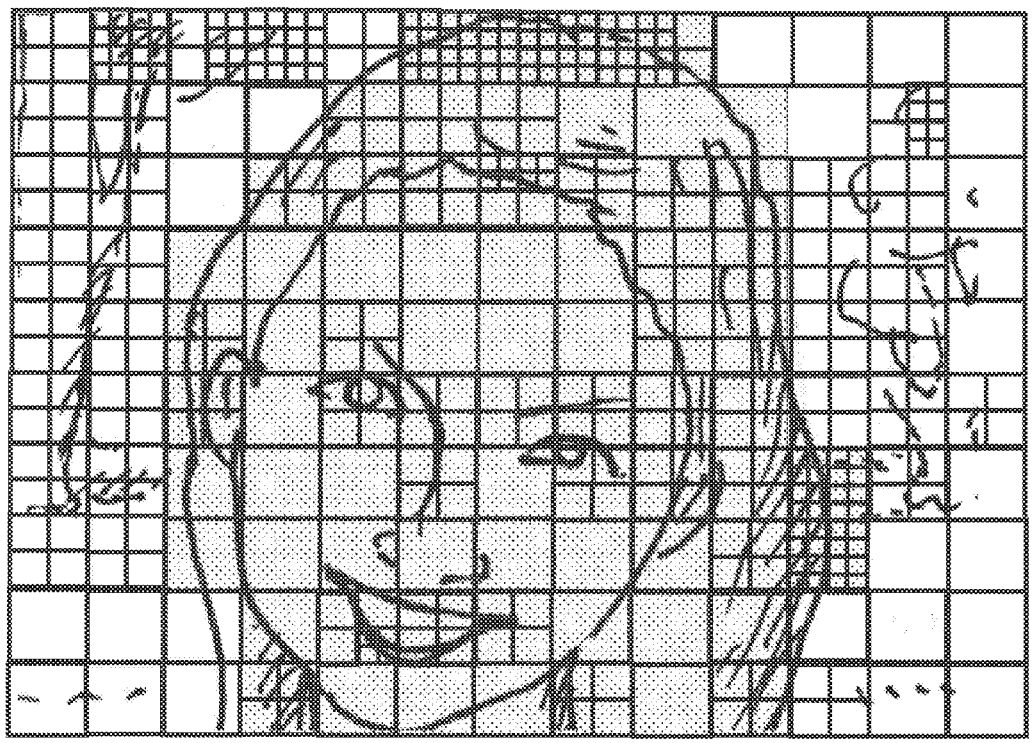
FIG. 8 illustrates an example where the second exemplary embodiment is applied to a scene.
Figure 8:
Figure 8:
Figure 8:
Figure 8:
Figure 8:
Figure 8:

FIG. 8 illustrates an example where the present exemplary embodiment is applied to coding of an actual scene. As illustrated in FIG. 8, the coding control unit 117 assigns blocks of 16 pixels×16 pixels to smooth uniform image areas of skin color, and blocks of 8 pixels×8 pixels or 4 pixels×4 pixels to image areas of complicated patterns. In the present exemplary embodiment, the coding control unit 117 further classifies the blocks into ones included in a main object area and ones not included in the main object area (i.e., background portions). In the example of FIG. 8, the shaded portions represent blocks that are determined to be included in the main object area. To the blocks determined to be included in the main object area, the quantization control unit 115 applies the mode in which the minimum quantization step value decreases as the size of the quantization block is reduced. To the blocks determined not to be included in the main object area, the quantization control unit 115 applies the mode in which the minimum quantization step value increases as the size of the quantization block is reduced.

According to the present exemplary embodiment, for example, in a facial close-up scene like FIG. 8, appropriate code amounts are distributed to the blocks of skin color even in the lower part of the frame. In addition, details within the main object like a face can be quantized and coded with high image quality.

Figure 9A:
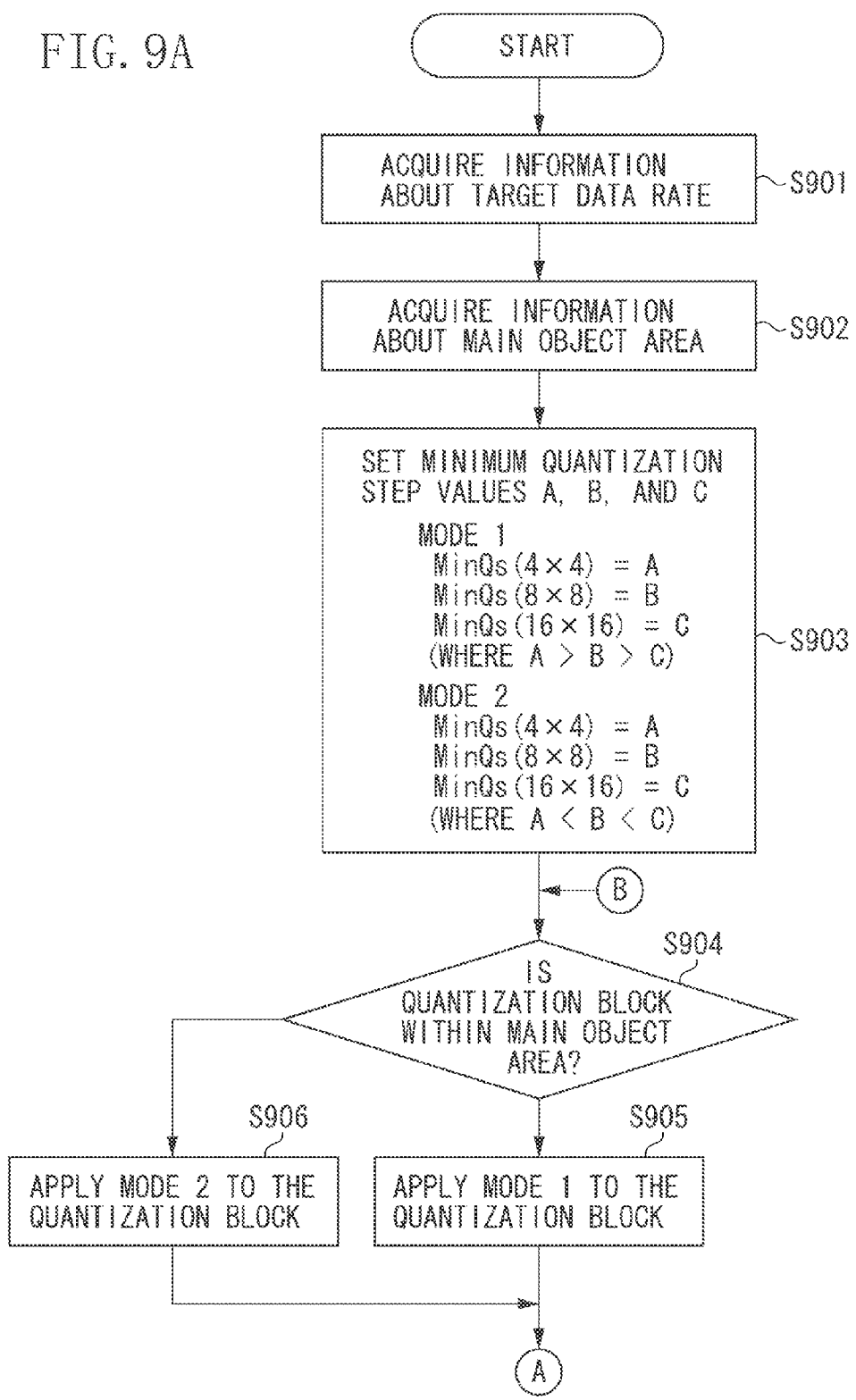

FIGS. 9A and 9B are flowcharts illustrating an example of control processing executed by the quantization control unit 115 according to the present exemplary embodiment. This flowchart is implemented by loading a program stored in the ROM of the quantization control unit 115 into the RAM and executing the program by the CPU.

In step S901, the quantization control unit 115 acquires information about a target data rate. In step S902, the quantization control unit 115 acquires information about a main object area. In step S903, the quantization control unit 115 sets minimum quantization step values A, B, and C for individual block sizes based on the target data rate. Here, the quantization control unit 115 sets mode 1 to be applied to quantization blocks outside the main object area (background portions) and mode 2 to be applied to quantization blocks within the main object area (main object). In mode 1, the minimum quantization step values A, B, and C are set to satisfy A>B>C, where A is the minimum quantization step value for 4 pixels×4 pixels, B is the minimum quantization step value for 8 pixels×8 pixels, and C is the minimum quantization step value for 16 pixels×16 pixels. FIG. 4A illustrates the minimum quantization step values A, B, and C set in mode 1. In mode 2, the minimum quantization step values A, B, and C are set to satisfy A<B<C, where A is the minimum quantization step value for 4 pixels×4 pixels, B is the minimum quantization step value for 8 pixels×8 pixels, and C is the minimum quantization step value for 16 pixels×16 pixels. FIG. 4B illustrates the minimum quantization step values A, B, and C set in mode 2. In the present exemplary embodiment, a plurality of modes is thus applied to the blocks.

In step S904, the quantization control unit 115 determines whether the intended quantization block is within the main object area. If the quantization block is not within the main object area (NO in step S904), then in step S905, the quantization control unit 115 applies mode 1 to the quantization block. If the quantization block is within the main object area (YES in step S904), then in step S906, the quantization control unit 115 applies mode 2 to the quantization block.

After the determination of the mode to be applied to the quantization block, the flow for applying the minimum quantization step value A, B, or C to the intended quantization block according to the block size is similar to that described with reference to FIG. 7 of the first exemplary embodiment (steps S704 to S713). A description thereof is thus omitted. In steps S705, S708, and S711 of the present exemplary embodiment, the minimum quantization step values in either mode 1 or mode 2, which is determined in step S905 or S906, are applied to the quantization block.

In the present exemplary embodiment, the minimum quantization step values are set based on block size and image features. In particular, the provision of the plurality of setting modes for setting the minimum quantization step values can reduce wasteful assignment of code amounts to blocks on which no visual effect cannot be expected even with reduced quantization step sizes. The resulting code amounts made available can be suitably assigned to blocks of the main object like a face, and further to detailed blocks within the main object. This can provide a high quality image by efficient coding.

In the foregoing description, the variance values of the blocks output from the feature extraction unit 502 have been used to estimate the degrees of difficulty of coding. However, motion search prediction errors (difference information) produced by the motion compensation prediction unit 111 may be used.

The feature extraction unit 502 has been described to detect the variance values block by block. However, a sum of the variance values of the entire frame may be used.

In the foregoing exemplary embodiments, the minimum quantization step values A, B, and C are set to satisfy A<B<C or A>B>C, where A, B, and C are the minimum quantization step values for quantization blocks of 4 pixels×4 pixels, 8 pixels×8 pixels, and 16 pixels×16 pixels, respectively. However, the minimum quantization step values A, B, and C may be set to satisfy A≤B≤C or A≥B≥C (except A=B=C).

The present disclosure is not limited to the foregoing exemplary embodiments, and may be applied with appropriate modifications depending on intended circuit forms without departing from the scope of the technical concept of the present disclosure.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Applications No. 2012-119175 filed May 25, 2012 and No. 2013-052495 filed Mar. 14, 2013, which are each hereby incorporated by reference herein in their entirety.

What is claimed is:

1. A coding apparatus comprising:
a transforming unit that transforms image data corresponding to a target block including in an image into transformed data, wherein a size of the target block is selected from different sizes;
a controlling unit that (a) determines a minimum value to be assigned to the target block in accordance with the size of the target block, (b) adjusts a quantization step size of the target block not to fall below the determined minimum value, and (c) adjusts a quantization step size of another block whose quantization step size exceeds a minimum value assigned to the another block to be closer to the minimum value assigned to the another block so that a code amount of the another block is increased;
a quantization unit that quantizes the transformed data using the adjusted quantization step size of the target block to generate quantized data; and
a coding unit that codes the quantized data.

2. The coding apparatus according to claim 1, wherein the minimum value to be assigned to the target block is determined in accordance with the size of the target block and a target data rate.

3. The coding apparatus according to claim 1, wherein the minimum value to be assigned to the target block is determined in accordance with the size of the target block and a feature of an image.

4. The coding apparatus according to claim 1, wherein the minimum value to be assigned to the target block is determined in accordance with the size of the target block and information about a main object area.

5. The coding apparatus according to claim 1, wherein the minimum value to be assigned to the target block is determined so that the minimum value to be assigned to the target block decreases as the size of the target block increases.

6. The coding apparatus according to claim 1, wherein the minimum value to be assigned to the target block is determined so that the minimum value to be assigned to the target block increases as the size of the target block increases.

7. A method comprising:
transforming image data corresponding to a target block including in an image into transformed data, wherein a size of the target block is selected from different sizes;
determining a minimum value to be assigned to the target block in accordance with the size of the target block;
adjusting a quantization step size of the target block not to fall below the determined minimum value;
adjusting a quantization step size of another block whose quantization step size exceeds a minimum value assigned to the another block to be closer to the minimum value assigned to the another block so that a code amount of the another block is increased;
quantizing the transformed data using the adjusted quantization step size of the target block to generate quantized data; and
coding the quantized data.

8. The method according to claim 7, wherein the minimum value to be assigned to the target block is determined in accordance with the size of the target block and a target data rate.

9. The method according to claim 7, wherein the minimum value to be assigned to the target block is determined in accordance with the size of the target block and a feature of an image.

10. The method according to claim 7, wherein the minimum value to be assigned to the target block is determined in accordance with the size of the target block and information about a main object area.

11. The method according to claim 7, wherein the minimum value to be assigned to the target block is determined so that the minimum value to be assigned to the target block decreases as the size of the target block increases.

12. The method according to claim 7, wherein the minimum value to be assigned to the target block is determined so that the minimum value to be assigned to the target block increases as the size of the target block increases.

13. A non-transitory computer-readable storage medium that stores a program for causing a computer to perform a method comprising:
transforming image data corresponding to a target block including in an image into transformed data, wherein a size of the target block is selected from different sizes;

determining a minimum value to be assigned to the target block in accordance with the size of the target block;

adjusting a quantization step size of the target block not to fall below the determined minimum value;

adjusting a quantization step size of another block whose quantization step size exceeds a minimum value assigned to the another block to be closer to the minimum value assigned to the another block so that a code amount of the another block is increased;

quantizing the transformed data using the adjusted quantization step size of the target block to generate quantized data; and coding the quantized data.

* * * * *